Patented Nov. 24, 1936

2,061,931

UNITED STATES PATENT OFFICE

2,061,931

MANUFACTURE OF ABRASIVE ARTICLES

Raymond C. Benner, Niagara Falls, Osborne L. Mahlman, Kenmore, and Walter D. Rossow, Niagara Falls, N. Y., assignors to The Carborundum Company, Niagara Falls, N. Y., a corporation of Pennsylvania No Drawing. Application December 6, 1934, Serial No. 756,328. In Canada June 20, 1932

8 Claims. (Cl. 51—278)

This invention relates to the manufacture of resin bonded abrasive articles and particularly to improvements in the method of making such an article which comprises wetting the abrasive grain with a suitable liquid and then mixing with the wetted grain the resin, in the form of a dry powder, which is to constitute the major portion of the bond in the cured article. This application is a continuation in part of prior application Serial No. 553,887, filed July 29, 1931.

Martin in his United States Patent No. 1,626,246 discloses a method of this general nature wherein the abrasive grains are wet with a relatively small amount of a resin solvent such as furfural. Kuzmick in his United States Patent No. 1,900,386 proposes to use benzaldehyde, and Novotny and Kuzmick in their United States Patent No. 1,924,748 propose to use furfural-alcohol, in similar processes. Webster and Sanford in their United States Patent No. 1,893,117 propose the use of a neutral non-aqueous liquid such as creosote oil, xylol, etc. in conjunction with a plasticizing agent, such as furfural, in a similar process.

These prior methods all involve the use of organic plasticizers which are relatively expensive. Furthermore the use of certain of the materials proposed heretofore involve the addition to the mix of materials which of themselves are not bonding materials and which may deleteriously affect the bonding characteristics of the resin used.

It is an object of this invention to eliminate the disadvantages of the prior art set forth above and to provide a method by which mixes of the nature described above may be made without the use of the expensive and offensive organic solvents, etc., and a method whereby abrasive articles of great strength may be produced.

The present invention contemplates the formation of abrasive articles by a method which comprises moistening the abrasive grain with a mixture of a liquid resin and water, mixing powdered potentially reactive resin with the so moistened grain and forming an article from the mix and hardening the article by heat. The mixture of water and resin may be homogeneous, having the clear appearance of a solution or it may constitute an emulsion of the resin in the water, or vice versa, or it may be a part solution and part emulsion. The mixture may comprise water and liquid resins which are normally miscible to a greater or less extent in the water or liquid resins which may be rendered miscible with water by the use of third agents. Similarly a mixture comprising an emulsion of the two liquids may be made by mixing water with liquid resin which naturally forms an emulsion with the water or by mixing water with the resin in which forms an emulsion with the water by the addition of a small amount of an emulsifying agent such as soluble casein.

The invention will now be further described in reference to specific examples but it will be understood that these are merely examples of certain embodiments of the invention which is capable of other embodiments and is limited only by the appended claims.

*Example I.*—25 grams of water are mixed with 25 grams of a normally liquid phenol formaldehyde resin which is partially miscible with water. This mixture is used to moisten 1760 grams of 36 grit aluminum oxide abrasive grain. The moistened or wetted grain is then mixed with 220 grams of a dry powdered potential reactive phenol formaldehyde resin to thoroughly coat the wetted grain with the powdered resin and form a relatively dry distributable mix. This mix may be readily cold pressed and wheels may be made by pressing in that manner under 2000 pounds pressure and curing by heating to 350° C. in five hours and holding at that temperature for sixteen hours. A test piece made in this manner had a tensile strength of over 2000 pounds per sq. inch.

*Example II.*—25 grams of a liquid phenol formaldehyde resin immiscible with water are mixed with an equal amount of water and an emulsion formed by the addition of one half gram of soluble casein. This emulsion is used to wet 1760 grams of 36 grit aluminum oxide abrasive grain. The wetted grain is then intimately mixed with 220 grams of dry powdered phenol formaldehyde resin to form a substantially dry distributable mix. This mix may also be readily cold pressed and wheels may be made by so pressing the mix at 2000 pounds per sq. inch pressure and curing as in Example I. A test piece made in this manner exhibited a tensile strength of over 2000 pounds per sq. inch.

*Example III.*—15 grams of water and 20 grams of a liquid phenol formaldehyde resin miscible with the water are intimately mixed and used to wet 1760 grams of 36 grit aluminum oxide abrasive grain. The wetted grain is intimately mixed with 220 grams of dry powdered heat hardening alkyd resin to coat the grain with the dry resin and form a substantially dry distributable mix. This mix is also readily cold pressed and wheels may be made in this manner by pressing at 2000 lbs. per sq. inch and curing as in Example I. A test piece made in this manner exhibited a tensile strength of over 2300 lbs. per sq. inch.

*Example IV.*—An emulsion made by mixing 7 grams of a liquid-drying-oil-modified alkyd resin with an equal amount of water is used to wet 583 grams of 36 grit aluminum oxide abrasive grain. The wetted grain is intimately mixed with 73 grams of a dry powdered heat hardening alkyd resin to coat the individual grains of abrasive material with the dry resin and form a substantially dry granular distributable mix. This mix as well as the three previously set forth may be either cold pressed or hot pressed. For example, wheels may be made from this mix by hot pressing at 2000 lbs. per sq. inch for about one half hour at a temperature equivalent to a steam pressure of 140 lbs. and curing as follows: 24 hours at 150° F., 24 hours at 200° F., 24 hours at 250° F., 24 hours at 300° F., and 72 hours at 350° F. A test piece made in this manner exhibited a tensile strength of more than 2400 lbs. per sq. inch.

It will thus be seen that the present invention provides an improved method of making resin bonded abrasive articles wherein the plasticizer used comprises a part of the resin bonding material and a cheap readily removable material which is not expensive and which evaporates to leave the mix composed wholly of materials which enter into the formation of the article and which may be readily pressed either hot or cold to produce abrasive articles of great strength.

We claim:

1. The method of making a resin bonded abrasive article which comprises moistening abrasive grains with a clear homogeneous mixture of a substantial proportion of water and a liquid resin miscible therewith, mixing a powdered resin with the moistened grain to form a substantially dry distributable mix wherein each abrasive granule has an outer coating of dry resin, forming an article from the said dry mix, and hardening the article by heating.

2. The method of making a resin bonded abrasive article which comprises moistening abrasive grains with a clear homogeneous mixture of a substantial proportion of water and a liquid phenolic condensation product resin miscible therewith, mixing a powdered resin with the moistened grain to form a substantially dry distributable mix wherein each abrasive granule has an outer coating of dry resin, forming an article from the said dry mix, and hardening the article by heating.

3. The method of making a resin bonded abrasive article which comprises moistening abrasive grains with a clear homogeneous mixture of a substantial proportion of water and a liquid resin miscible therewith, mixing a powdered potentially reactive resin with the moistened grain to form a substantially dry distributable mix wherein each abrasive granule has an outer coating of dry resin, forming an article from the said dry mix, and hardening the article by heating.

4. The method of making a resin bonded abrasive article which comprises moistening abrasive grains with a clear homogeneous mixture of a substantial proportion of water and a liquid resin miscible therewith, mixing a powdered phenolic resin with the moistened grain to form a substantially dry distributable mix wherein each abrasive granule has an outer coating of dry resin, forming an article from the said dry mix, and hardening the article by heating.

5. The method of making a resin bonded abrasive article which comprises moistening abrasive grains with a clear homogeneous mixture of a substantial proportion of water and a liquid resin miscible therewith, mixing a powdered alkyd resin with the moistened grain to form a substantially dry distributable mix wherein each abrasive granule has an outer coating of dry resin forming an article from the said dry mix, and hardening the article by heating.

6. The method of making a resin bonded abrasive article which comprises moistening abrasive grains with a clear homogeneous mixture of a substantial proportion of water and a liquid phenolic condensation product resin miscible therewith, mixing a powdered potentially reactive resin with the moistened grain to form a substantially dry distributable mix wherein each abrasive granule has an outer coating of dry resin, forming an article from the said dry mix, and hardening the article by heating.

7. The method of making a resin bonded abrasive article which comprises moistening abrasive grains with a clear homogeneous mixture of a substantial proportion of water and a liquid phenolic condensation product resin miscible therewith, mixing a powdered potentially reactive phenolic resin with the moistened grain to form a substantially dry distributable mix wherein each abrasive granule has an outer coating of dry resin, forming an article from the said dry mix, and hardening the article by heating.

8. The method of making a resin bonded abrasive article which comprises mixing a substantial proportion of water with a liquid resin miscible therewith to form a clear homogeneous mixture, moistening abrasive grains with the mixture, mixing a powdered resin with the moistened grain to form a substantially dry distributable mix wherein each abrasive granule has an outer coating of dry resin, forming an article from the said dry mix, and hardening the article by heating.

RAYMOND C. BENNER.
OSBORNE L. MAHLMAN.
WALTER D. ROSSOW.